United States Patent [19]

Impink, Jr. et al.

[11] Patent Number: 4,803,039
[45] Date of Patent: Feb. 7, 1989

[54] ON LINE INTERACTIVE MONITORING OF THE EXECUTION OF PROCESS OPERATING PROCEDURES

[75] Inventors: Albert J. Impink, Jr., Murrysville Boro; Melvin H. Lipner, Monroeville; Roger A. Mundy, North Huntingdon, all of Pa.

[73] Assignee: Westinghouse Electric Corp., Pittsburgh, Pa.

[21] Appl. No.: 825,427

[22] Filed: Feb. 3, 1986

[51] Int. Cl.⁴ .............................................. G21C 7/36
[52] U.S. Cl. ..................................... 376/216; 364/188
[58] Field of Search ................. 364/188, 189, 431.01, 364/431.12; 376/245, 215, 216, 217; 371/29

[56] References Cited

U.S. PATENT DOCUMENTS

| | | | |
|---|---|---|---|
| 3,873,817 | 3/1975 | Liang | 376/254 |
| 4,189,765 | 2/1980 | Kotalik et al. | 364/188 |
| 4,552,718 | 11/1985 | Impink, Jr. et al. | 376/216 |
| 4,608,223 | 8/1986 | Twilley, Jr. | 364/188 |
| 4,632,802 | 12/1986 | Herbst et al. | 376/216 |
| 4,635,183 | 1/1987 | Isobe et al. | 364/188 |
| 4,644,478 | 2/1987 | Stephens et al. | 364/188 |
| 4,648,028 | 3/1987 | DeKlotz et al. | 364/188 |
| 4,651,273 | 3/1987 | Braitinger et al. | 364/188 |
| 4,654,852 | 3/1987 | Bentley et al. | 364/188 |
| 4,679,137 | 7/1987 | Lane et al. | 364/188 |
| 4,740,349 | 4/1988 | Loftus | 376/216 |

FOREIGN PATENT DOCUMENTS

| | | | |
|---|---|---|---|
| 0095612 | 6/1984 | Japan | 364/188 |
| 0427535 | 5/1974 | U.S.S.R. | 364/188 |
| 0489079 | 10/1975 | U.S.S.R. | 364/188 |

OTHER PUBLICATIONS

"Automatic Control Plus Manual Control Equals Automanual Control", Kelley et al., Control Engineering, May 1973 pp. 49-51.

Primary Examiner—Thomas H. Tarcza
Assistant Examiner—David Cain
Attorney, Agent, or Firm—D. C. Abeles

[57] ABSTRACT

The operator of a complex process facility is aided in executing step by step procedures by a computer based system which incorporates monitored plant data and interactive plant operator responses to prompts to progress step by step through selected procedures. At each procedure step the plant status is evaluated and a recommended course of action is identified. The results are displayed on a visual display device to provide operator guidance for executing the procedure in effect. Parallel process monitoring visually alerts the user to conditions not considered by the current step of the active procedure, and where the seriousness of the other condition warrants, provides procedure-based recommendations for priority action. The system can be accessed by multiple users at separate locations for coordinated execution of a single procedure or simultaneous execution of two different procedures. A permanent chronological record of the step by step execution of the selected procedures including the pertinent plant conditions and operator responses, and the parallel monitored status tree conditions is also generated by the system for subsequent review and analysis.

43 Claims, 11 Drawing Sheets

09:09:05 (b)

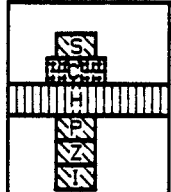

CONTINUOUSLY MONITORED (w)
INFORMATION (w)

RED BRANCH ON HEAT SINK (w)

E-0: REACTOR TRIP OR SAFETY INJECTION (w)

14 CONTAINMENT SPRAY NOT REQUIRED (g)

15 SI FLOW VERIFIED (g)

16 AFW FLOW LESS THAN 470 GPM (g)

IF AFW FLOW GREATER THAN 470 GPM CAN (b)
   NOT BE ESTABLISHED, (b)
   THEN GO TO FR-H.I, RESPONSE TO LOSS (b)
   OF SECONDARY HEAT SINK, STEP I (b)

17 VERIFY AFW VALVE ALIGNMENT-PROPER (g)
   EMERGENCY ALIGNMENT (g)

18 VERIFY SI VALVE ALIGNMENT-PROPER (g)
   EMERGENCY ALIGNMENT (g)

---

ENTER T TO TRANSITION TO FR-H.I (b)
OR ENTER O TO OVERRIDE (b)

© Westinghouse Electric Corporation 1984 (w)

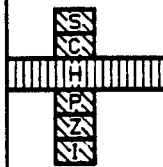

CONTINUOUSLY MONITORED (w)
INFORMATION (w)

CAUTION: IF OFFSIDE (w)
POWER IS LOST AFTER SI (w)
RESET, MANUAL ACTION MAY (w)
BE REQUIRED TO RESTART (w)
SAFEGUARDS EQUIPMENT (w)

FR-H.1: RESPONSE TO LOSS OF HEAT SINK (w)

03  ALL RCP STOPPED (g)

04  AT LEAST ONE CHARGING/SI PUMP (g)
    AVAILABLE (g)

05. TRY TO ESTABLISH MAIN FW FLOW TO (g)
    AT LEAST ONE SG (g)
    CONDENSATE SYSTEM IN SERVICE (y)
    FW ISOLATION VALVES CLOSED (y)

PERFORM THE FOLLOWING: (b)
    1) RESET SI IF NECESSARY (b)
    2) RESET FW ISOLATION (b)
    3) OPEN FW ISOLATION VALVES (b)

06  CHECK SG LEVELS (g)

07  TRY TO ESTABLISH FEED FLOW FROM (g)
    CONDENSATE SYSTEM (g)

ENTER C WHEN COMPLETED (b)
OR ENTER O TO OVERRIDE (b)

© Westinghouse Electric Corporation 1984 (w)

| | CONTINUOUSLY MONITORED (w) INFORMATION (w) SI REINITIATION REQUIRED (y) MANUALLY REINITIATE SI (y) | CAUTION (y) |

FR-H.1: RESPONSE TO LOSS OF HEAT SINK (w)

07 FEED FLOW FROM CONDENSATE SYSTEM (g)
   ESTABLISHED (g)

08 NO SG LEVEL SATISFACTORY (g)

09 LOSS OF SECONDARY HEAT SINK INDICATED (g)

10 ACTUATE SI (g)

11 VERIFY RCS FEED PATH (g)

- - - - - - - - - - - - - - - - - - - - - - -

ENTER C WHEN COMPLETED (y)
OR ENTER O TO OVERRIDE (y)

© Westinghouse Electric Corporation 1984 (w)

FIG. 6

ON LINE INTERACTIVE MONITORING OF THE EXECUTION OF PROCESS OPERATING PROCEDURES

A portion of the disclosure of this patent document contains material which is subject to copyright protection. The copyright owner has no objection to the facsmile reproduction by anyone of the patent document or the patent disclosure, as it appears in the Patent and Trademark Office patent file or records, uut otherwise reserves all copyright rights whatsoever.

BACKGROUND OF THE INVENTION

1. Field of the Invention

This invention is directed to a method and apparatus for aiding an operator in executing step by step procedures during the operation of a complex process facility such as a nuclear power plant. More particularly, it involves a computer based system which incorporates monitored plant data and interactive plant operator responses to recommended actions for step by step progression through a selected procedure while simultaneously providing parallel information which allows the operator to assess other plant conditions which may require attention.

2. Prior Art

The operation of a complex process facility requires the assimilation of a large amount of data, an evaluation of the status of the process and the various component systems from those data, and informed, decisive action based upon such evaluation. While much of the operation of the modern complex process facility is automatically controlled, overall supervision of the facility is always the responsibility of a human operator. Even in a highly automated facility, there are usually normal operating and maintenance, and in some instances, surveillance procedures, which require action by a human operator. Abnormal and emergency operating conditions invariably call for further intervention by the operator.

Typically, the operator of the complex process facility is provided with written or "paper" procedures whereby the steps to be followed are presented in the form of verbal statements on a printed page. These paper procedures require the human who is responsible for carrying out the actions and operations described in the appropriate procedure to read the procedure text, gather specified data and filter the data through preset evaluation logic to identify recommended action steps. The paper procedures often require the human operator to simultaneously monitor other conditions affecting the status of the facility while following the current step by step procedure. In effect, this requires the operator to remember the requirement to monitor the status condition and to periodically check for data related to that condition.

One type of facility in which paper procedures are used to guide the human operator in effective management of a complex process is a nuclear power plant. Extensive paper procedures are used in these facilities, especially during emergency conditions following a reactor trip. Subsequent to the accident at Three Mile Island Unit 2 in 1979, the U.S. Nuclear Regulatory Commission issued requirements which have led to a dramatic increase in both the breadth and depth of Emergency Operating Procedures (EOP) at nuclear power plants. In response to these expanded requirements, the Westinghouse Owners Group has developed written generic guidelines which have subsequently been adapted to meet the specific needs and characteristics of the various nuclear generating units represented by the Owners Group and have been issued to the generating crews of the units as Emergency Operating Procedures. These procedures contain explicit directions for the control room operations crew to implement appropriate emergency response strategies. However, the individual charged with implementing such strategies (typically a Senior Reactor Operator [SRO]) remains tied to static procedures, considering changes to plant status in serial fashion, and is potentially unable to properly develop an overview of the plant condition.

Commonly owned U.S. Pat. No. 4,552,718 describes a system which generates meaningful information for the operator of a pressurized water reactor (PWR) on six critical safety functions which must be maintained or reestablished, if lost, during emergency operation. The system uses a status tree approach to generate automatically, or through manual responses by an operator, a visual indication of the current status of all six critical safety functions. The display is color coded from green, through yellow and orange, to red to indicate the degree of threat to each safety function. This system is used in conjunction with the paper procedures to alert the operator, who is absorbed in the steps of a particular emergency procedure, to the overall condition of the plant as expressed by the status of the six critical safety functions. The visual presentation also includes the title of the paper procedure to which the operator should turn to find the sequence of steps to be followed in mitigating the effects of the more serious threats to critical safety functions.

While the status tree system advises the operator of any threats to the critical safety functions and suggests a procedure to be followed, the operator must still locate the recommended procedure in the paper procedures and then follow it manually step by step. The status tree system also does not keep the operator apprised of other plant conditions which the paper procedures require to be monitored, but which do not directly affect the critical safety functions.

Accordingly, it is an overall object of this invention to provide a method and apparatus for aiding the operator of a complex process facility in executing plant procedures.

It is a more specific object of the invention to aid the operator of a complex process facility by providing a computer based system and a method of operation which incorporate montored plant data and interactive plant operator responses to recommended actions for step by step progression through a selected procedure.

It is a further object of the invention to provide such a system and method of operation which simultaneously, while providing step by step interactive progression through a selected procedure, provide parallel information to the operator concerning other plant conditions which may require attention.

It is an additional object of the invention to provide a system and method of operation which generate a permanent record of appropriate system and process conditions at the completion of each step of each procedure or at periodic intervals of time, so that the actual progress of the operator through the procedures can be reconstructed at a later time.

SUMMARY OF THE INVENTION

These and other objects are realized by a method and apparatus for on-line monitoring of the execution by a human operator of procedures for a complex process facility in which the steps of a selected procedure are sequentially called from storage for presentation on a visual display device as the current step to be performed by the operator. The status of a process condition addressed by the current step is automatically determined by continuous monitoring of selected process parameters for visual presentation to the operator. Where the current values of the appropriate parameters indicate that the existence of a desired condition under consideration by the current step is not verified, a visible textual statement of recommended action to be taken by the operator is selected from a library of textual statements and presented. Visual prompts are also generated to indicate to the operator the steps to take to generate an input signal responsive to the current step. If through the continuous monitoring of the appropriate process parameters a change in the status of a relevant process condition is detected during the time that any one procedure step is current, the displayed statements of conditions and of recommended operator actions and the displayed prompts for operator response are all updated to reflect this change. Thus, the operator's response is always guided by actual current conditions, rather than by those conditions that had existed when execution of the current step was first initiated. By this updating process the effects of operator actions in carrying out a procedure step are incorporated both in the logging of the conditions at the completion of the step and in the prompting of the operator's response at the end of the step. Upon receipt of the response, the next step in the procedure is selected as the current step. Thus the operator always remains in control. Textual statements of the steps are automatically visually presented along with an analysis of current conditions which are the subject of the step, and, where appropriate, suggested action to be taken, but the operator must take the action.

Simultaneously with execution of the current steps of the step by step procedure, certain parameter signals representative of other continuously monitored process conditions not being addressed by the current steps are monitored electrically, and when such a parallel monitored process condition is in a state which warrants operator attention, a visual indication of this is presented along with the current step information. This visual indication can take the form of a textual statement of action required in response to the status of this other condition. Priorities are assigned to the action called for by the current step and in response to the other condition and only the prompts associated with the action having the higher priority are presented to the operator. The action called for may be to transfer to another step by step procedure. The operator can indicate his assent by generating a transfer signal which will result in the establishment of a step, usually the initial step, of the new procedure as the current step. The operator may also override the recommended transfer and return to the current step of the active procedure.

The overall status of the facility, such as the status of critical safety functions in a nuclear power plant which are determined by a status tree analysis of appropriate monitored parameters, is also monitored by the parallel monitor and visually presented to the operator. When called for, a visual textual statement of a recommendation to transfer to a procedure designed to address the abnormal status of a critical safety function is visually presented with prompts that permit the operator to effect the transfer or to override the recommendation.

In the preferred embodiment of the invention, statements of a preselected number of the most recently executed and the next to be executed steps, for example two of each, are visually presented to the operator along with the current step information to provide a broader picture of where he is in the procedure.

According to another aspect of the invention, multiple users can execute a single procedure from separate locations. With this arrangement the actions of the multiple users are coordinated to avoid possible conflicts and eliminate the delays associated with coordination through voice communications. In a related embodiment, two or more different procedures can be executed by operators at separate locations or by a single operator at his normal work station while the parallel process monitor feature associated with the execution of each procedure monitors plant parameter data stored in common memory to warn of conflicts with the other active procedure or procedures if any should arise. The tasks associated with carrying out two or more procedures simultaneously may be carried out in separate digital computers or in one computer having sufficient capacity to perform all the tasks.

The invention also provides for logging of the time of completion of each procedure step and relevant component and system status including the results of specified operator actions at the completion of each step and overall plant status as indicated by the parallel process monitor feature.

BRIEF DESCRIPTION OF THE DRAWINGS

A full understanding of the invention can be gained from the following description when read in conjunction with the drawings in which:

FIGS. 3 through 6 are illustrations of typical displays generated during operation of the system of FIG. 1;

DESCRIPTION OF THE PREFERRED EMBODIMENTS

The invention will be described as applied to a pressurized water reactor (PWR) nuclear power plant, but it should be realized that it has application to a variety of complex process facilities such as, for example, chemical plants, refineries, and the like. In fact it is adaptable to various facilities where a human operator is required to follow preconceived, although not necessarily rigid, step by step procedures, and is most useful in those facilities in which the sequence of steps depends at least in part upon current conditions in the complex process facility. It may be used for instance in monitoring the execution of normal operating procedures, maintenance procedures, surveillance procedures, emergency operating procedures, abnormal operating procedures and alarm response procedures. For purposes of illustration, the invention will be described as applied to monitoring the execution of emergency procedures for a PWR, and specifically, the Emergency Operating Procedures developed by the Westinghouse Owners Group. Illustrations will also be presented of the invention as applied to a single PWR procedure performed by two separated users, and to two different start up procedures performed simultaneously by two different operators.

Figure 1:
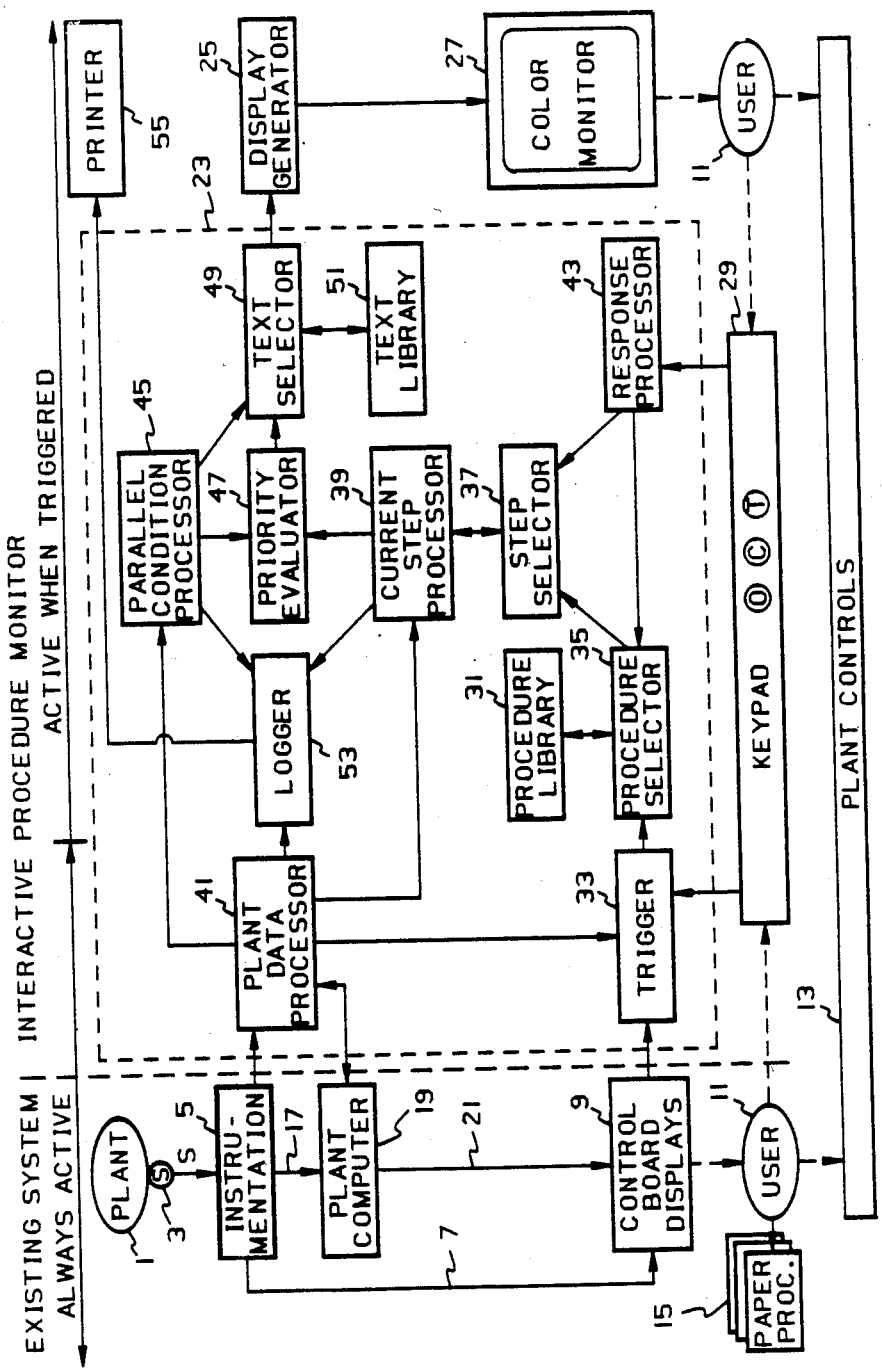
FIG. 1 is a schematic diagram of a system in accordance with the invention for on-line monitoring of the execution of procedures in a nuclear power plant.

FIG. 1 illustrates a PWR power plant adapted for implementing the above application of the invention. The plant 1 is instrumented with numerous sensors 3 which monitor various plant parameters such as temperatures, pressures, flows, radiation levels, tank levels, equipment status, and the like. The signals, S, generated by the sensors are initially processed by instrumentation 5 which provides conventional signal processing such as surge protection, buffering, isolation, filtering, span control, conversion to engineering units, et cetera. The instrumentation 5 also generates logical signals representative of plant conditions of interest by comparing certain of the initially processed sensor signals with set point values. The processed sensor signals and logical signals generated by the instrumentation 5 are supplied over the line 7 to the control board displays 9 in the plant control room for visual presentation to the user 11, namely, the control room personnel. The control board displays 9, which are conventional, utilize the processed sensor signals to generate visual representation of the measured values of the associated parameters and the logical signals to produce visual indications of the status of the plant conditions of interest. The operator then uses this information in analyzing the state of the plant and its various subsystems and in making decisions as to if, when, and what adjustments should be made to the plant controls 13. In making these decisions, the operator presently has access to paper procedures 15 which provide step by step guidance through a logical sequence of analysis and action.

The initially processed sensor signals and the logic signals generated by the instrumentation 5 are also fed over line 17 to a plant computer 19 which performs surveillance and logging functions. This computer 19 also calculates certain parameters such as for instance the departure from nucleate boiling ratio (DNBR) and degrees of subcooling from the measured parameters. Some of these calculated parameters are transmitted to the control board displays 9 over lead 21 for presentation to the operator.

All of what has been described to this point is currently found in a typical PWR plant. The present invention provides a system which replaces the paper procedures 15 in providing guidance for the operator 11 in monitoring plant performance and in manipulating the plant controls 13. The system has been designed to assist the plant operators in executing procedures more efficiently and cost effectively. It is an on-line tracking system which allows the operating staff to access and follow procedures in an easy and logical manner. As mentioned previously, it can be used for all types of procedures in addition to the emergency operating procedures used in the exemplary system.

The purpose of the computerized procedure system is threefold:
 To guide the user step by step through the procedures by monitoring the appropriate plant data, by processing the data, and by identifying the recommended course of action.
 To provide the necessary parallel information which allows the operator to assess other plant conditions which may require attention.
 To provide a record of parameters and events.
 The system accomplishes its purpose by the execution of the concurrent but independent functions of procedure processing, parallel information monitoring, and parameter and condition logging. The procedure processor controls the flow of the procedures and of the individual steps of the current procedure and includes a collection of subroutines containing the logic of the procedures. The parallel information monitor tracks system or safety conditions that may affect plant operations. The conditions logger generates a permanent chronological record of parameter and component states and actions taken. The interfacing parts of the system provide the links between the data sources and the central functions of the system and between the system, per se, and the human user or users.

The system includes a digital computer 23 which receives sensor and logical signals from the instrumentation 5 and calculated parameter values from the plant computer 19. The computer 23 may consist of a single main frame unit with an operating system which supports real time multi-task operations or several microprocessors linked by a data highway, with each microprocessor handling a single task. Alternatively, the software may be resident in the plant computer 19 where that unit has the dual processing capability and the capacity to perform the routines required. A suitable stand alone unit is the Gould/SEL 32/8780 computer, which is a dual-processor (CPU/IPU) 32-bit, minicomputer running the standard SEL MPX real-time operating system. The computer 23 interfaces to a display generator 25 (such as a Raster Technologies Model 180 unit) to provide the color graphics output of the procedures program on a visual display device such as a high-resolution color monitor 27. The user 11, or operator, observes the visual display generated on the color monitor and provides input to the system through a keypad or equivalent device such as a touch screen overlay on the color monitor 29.

The architecture of the software for the system is illustrated within the chain line of FIG. 1 representing the computer 23. Central to the software package is a library 31 of subroutines, each of which embodies the logic and alternative recommended action steps for one procedure. This library of step by step procedures is stored in computer memory or in a high capacity, on line device such as a computer disk. Operation of the system is initiated by a trigger 33 in response either to a user input from the keypad 29, or to an indication of a particular set of plant conditions, such as a reactor trip, received from he control board displays 9. The trigger 33 activates a procedure selector 35 containing the necessary logic to select the appropriate procedure from the library 31 (i.e. call the appropriate subroutine from memory) and to establish that procedure as the active procedure.

A step selector 37 sequentially selects the steps of the active procedure one at a time for a current step processor 39. Inputs to the current step processor 39 are obtained from two sources. A plant data processor 41 collects plant data, including calculated parameters from the instrumentation 5 and plant computer 19, and transforms numerical (and analog) information into logical form for use in the procedure logic. For instance, a temperature signal is transformed into a digital signal which indicates whether the current value of the temperature is above or below a given set point value. The plant data processor 41 effectively isolates the procedure sub-routines from the raw plant data sources. Therefore, changes in the data sources (incorporation of additional signals, upgrades of the plant computer, et cetera) would necessitate changes only in the plant data processor. The human user provides inputs to the current step processor through the keypad or equivalent device 29 and a response processor 43. User inputs usually take the form of single keystroke interactive responses to specific prompts generated by the current step processor 39. However, provision also exists for user input of plant status data not available to the plant data processor 41 when such data are required in executing the logic of a particular current step.

As indicated in FIG. 1, the plant data processor 41 and the trigger 33 are always in service while the remaining portions of the software are only active when triggered. Accordingly, the plant data processor can be used to respond to alarm conditions indicated by selected patterns of parameter values by triggering call up of the appropriate procedure.

A parallel condition processor 45 operates independently of the current step processor 39 to provide parallel, concurrent monitoring of overall plant and individual system conditions in areas not directly considered by the procedure in effect. If the parallel condition processor detects an unexpected condition, such as might arise as a result of operations or casualties unrelated to the currently active procedure, a priority evaluator 47 applies a preset logic to determine whether the unexpected condition is sufficiently severe to recommend to the user suspension of the current procedure in the current step processor 39 and initiation of a different course of action involving another procedure to treat those conditions. When the system is used to implement maintenance or operating procedures, this parallel condition processor 45 would be used to keep track of what others were doing in other parts of the plant.

Both the current step processor 39 and the parallel condition processor 45 also communicate directly with a text selector 49 which selects appropriate lines of text, based in part on relative priorities, from a text library 51, and passes those lines of text to the display generator 25. Since the text library consists simply of lines of text in Hollerith (or equivalent) form stored at preset locations in memory, the library can be in any convenient phonetic language, i.e. a Spanish version of the system package would differ from the English version of the package only in the form that the individual lines of text would take in the text library.

The display generator 25 accepts the specified lines of text from the text selector 49 and constructs a display image on the color monitor 27. As will be seen in more detail, this display provides the user with information regarding plant and system status as seen both by the active procedure and by the parallel condition processor 45 with the next recommended action step, and with the appropriate prompts to permit incorporation of user responses in progressing through the procedure logic. The user observes the textual images produced by the display generator 25 on the color monitor 27 and communicates his desired responses by way of the keypad or equivalent device 29 which transmits them to the response processor 43. User responses to action recommended by the current step processor typically result in indexing the step selector 37 to the next step in the active procedure. Responses to action recommended by the parallel condition processor 45 can result in a return to the current step or a signal to the procedure selector 35 to transfer to another procedure.

The last piece of software in the software package is a logger 53 which accepts processed data from the plant data processor 41 and procedure, step, plant, system, and safety status, and user response information from the current step processor 39 and parallel condition processor 45, and qenerates a continuous record of conditions and actions during the operations that are being carried out. A permanent chronological record of conditions and actions is obtained by coupling a permanent copy device, such as a printer 55, or a magnetic tape recorder or the like, to the logger 53.

The current step processor 39, parallel condition processor 45, plant data processor 41, display generator 25 and logger 53 execute concurrently and independently of each other, but function as a whole through the use of shared global data.

Figure 2:
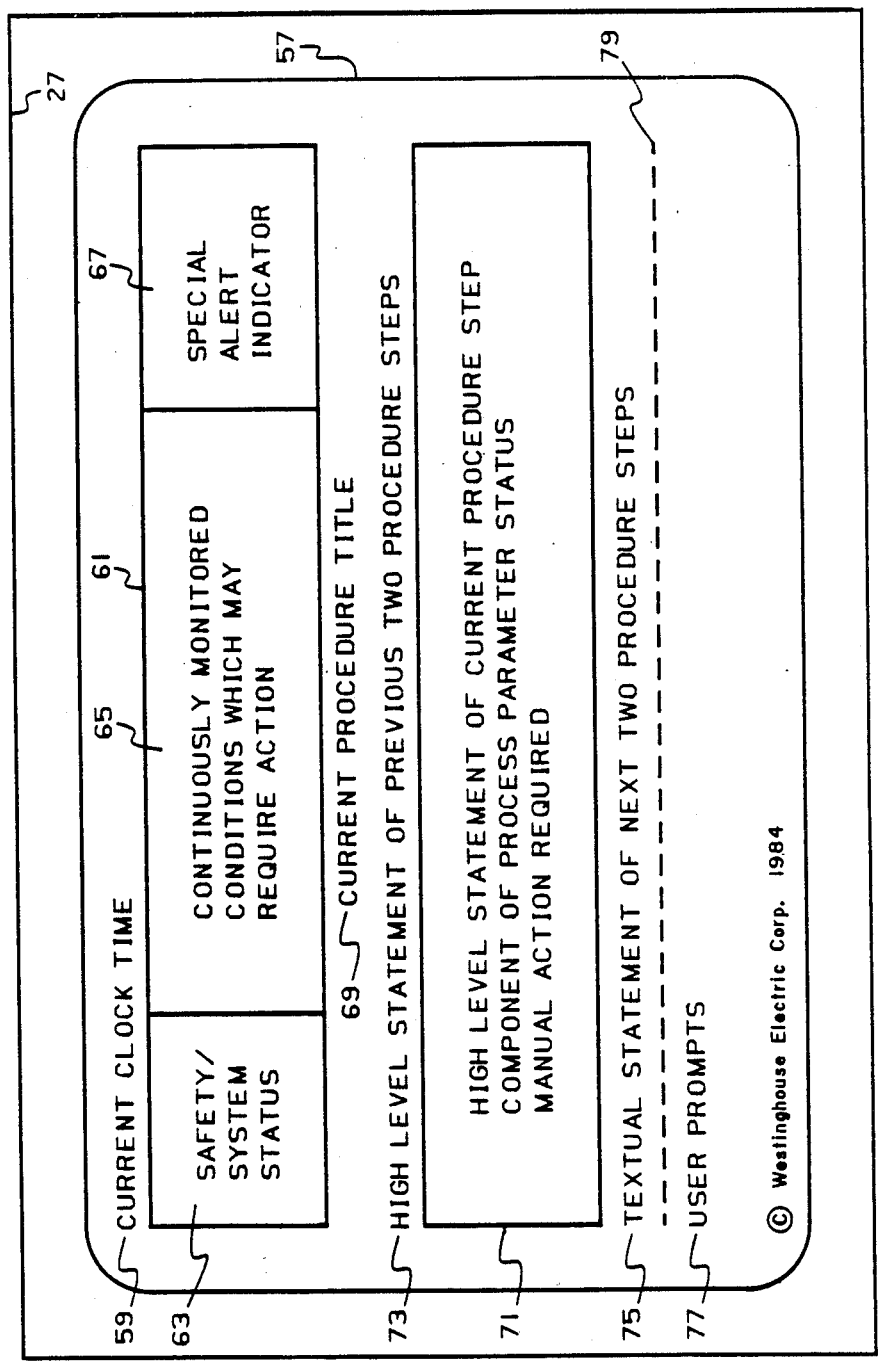
FIG. 2 is an illustration of the format of the visual display generated by the system of FIG. 1 and presented on a display device which forms a part thereof.

FIG. 2 illustrates the format of the visual display generated by the display generator 25 for presentation on the color monitor 27. Working from the top to the bottom of the display, the current clock time is displayed in the upper left hand corner at 59. Information generated by the parallel condition processor is displayed in a box 61 just below the time. The system allows the user to understand overall system or safety status by displaying a summary of those items which are considered crucial in a window 63 at the left end of the box 61. This enables the user to judge at any time whether these items are satisfied or not.

The system also allows the user to understand the status of the other conditions which require monitoring during procedure execution. Typically, Notes and Cautions appear throughout a set of procedures. These are additional items which the user must remember, such as tank levels and component states. The system alleviates this burden on the operator's memory by automatically keeping track of these items for the system user. If a Note or Caution requires attention, the system informs the user of this fact, along with a statement of action necessary, if any, to solve the problem, in the center window 65 of the box 61.

Should a condition arise in either the "Safety/System Status" 63 or the "Continuously Monitored Conditions" 65 window which requires user attention, a flashing indication appears in the "Special Alert Indicator" window 67 of box 61. This serves as an additional cue to the system user that something is amiss.

The system displays the title of he active procedure at 69 below the box 61, allowing user personnel to quickly identify which procedure is in use. In a situation where transitions or moves to other procedures are required, the new procedure title is displayed immediately upon selection by the user.

Information related to the current step being executed is displayed in the box 71 in the center of the display. In order to allow the user to quickly understand the status of the current step, a high level statement of the step is presented first. For example, if the procedure step is to verify a turbine trip and the turbine is indeed tripped at that point in time the high-level statement reads "TURBINE TRIP VERIFIED". If the turbine is not tripped, then the high level statement reads "TURBINE TRIP NOT VERIFIED". The system also informs the user of the status of the parameters or components which led to the high-level statement immediately below the statement. For example, in the case of the turbine trip, the components of concern are the turbine stop valves. Hence, if the turbine stop valves are closed, the verbal statement "TURBINE STOP VALVES CLOSED" appears on the screen. This is supporting information in the subject system. Under the paper procedures, the operator would have to check the status of the turbine stop valve position indicators on the control board displays personally in order to then come to the conclusion that the turbine is tripped. With the subject invention, the computerized system monitors the turbine stop valves and automatically generates the turbine tripped indication in the proper sequence in the procedure while presenting the operator with the underlying pertinent data.

The subject system also informs the user of the actions, if any, which are recommended in response to the current procedure step, through a verbal statement in the box 71 below the component or parameter status statement. For example, if the turbine is not tripped, then the action required "MANUALLY TRIP TURBINE" appears on the screen.

To provide the operator with more perspective, the system also displays at 73, between the title of the current procedure at 69 and the current step box 71, the high-level statement of a preselected number, in the preferred embodiment two, of the previous steps of the current procedure. Likewise, the high-level statements of a preselected number, again preferably two, of the next steps in the procedure are displayed immediately below the current step at 75.

User prompts are presented at the bottom of the display at 77 below a dashed line 79 separating the prompts from the next steps. The prompts tell the user what he must do to interact with the computerized system. The subject system prompts the user in a clear and understandable way. For example, if an action such as "MANUALLY TRIP TURBINE" is recommended, the system prompts the user to enter a "C" on the keypad 29 when the action is completed, or to enter an "O" to override the step if he does not wish to take the action. Note that the user remains in control at all times. The system gathers data, analyzes conditions of interest and suggests action, but only the operator implements the recommended action. The system need only be informed of hether the action has been taken or not. The system also independently monitors the consequence of operator actions through its continuous monitoring and update feature when the operator's action results in a change in a process condition.

If no action is recommended, the system prompts the user to "KEY RETURN" to go to the next procedure step. If a move to another procedure is recommended, the system prompts the user to enter a "T" to transition to the new procedure. Since the logic of the recommended move to a new procedure is programmed into the system, the system will automatically transition to the new procedure when the user enters a "T". Entering an "O" enables the user to override the transition and continue to follow the currently active procedure. Should the user need to choose among several potential new procedures, the system systematically asks the user, one at a time in order of priority, which procedure he would like to implement.

The operator interface capabilities of the subject system just described provide a very powerful and useful tool in following procedures. This tool can be used to more efficiently and effectively follow procedures, thus greatly minimizing the potential for costly error. By bringing all the information to one place, the subject system gives the user a complete picture of what is happening while guiding him through the procedures.

Application to Emergency Procedures

A Senior Reactor Operator implementing emergency procedures must keep track of multiple events simultaneously. He must follow the appropriate procedure step by step. He must remember various other component states and process parameter conditions necessary for transient recovery. And, most importantly, he must continually monitor the overall safety status of the plant. Thus, although current emergency procedures are very comprehensive, the price exacted is increased complexity in that the human being must be aware of the plant on several levels concurrently.

The Westinghouse Owners Group (WOG), in response to the requirements resulting from the TMI event, generated a comprehensive package of generic operating instructions for coping with plant emergencies. The package, referred to as the Emergency Response Guidelines (ERGs), provides operating instructions for two distinct types of situations. For those events which can be diagnosed by an unambiguous set of symptoms, specific guidelines have been developed to allow optimal plant recovery (Optimal Recovery Guidelines—ORGs). For other events and/or malfunctions which are not amenable to diagnosis, a separate set of guidelines is provided whose function is to satisfy a limited set of Critical Safety Functions (Function Restoration Guidelines—FRGs). The set of Critica Safety Functions was defined to be those necessary to protect the three primary boundaries preventing fission product release: the fuel matrix/cladding, primary system boundary, and containment building. The ORGs inherently contain instruction steps to maintain all of the Critical Safety Functions. However, the FRGs only contain actions to restore and maintain the Critical Safety Functions, and contain limited quidance, if any, on recovering the plant. In response to any protection system or safeguards system actuation, the Optimal Recovery Guidelines are entered first to obtain a diagnosis and perform the subsequent optional recovery. Whether the event is diagnosed or not, the status of the Critical Safety Function (CSF) set is monitored using a corresponding set of status trees. Each tree consists of a series of binary decision points (branches) leading to a unique status condition for the CSF based on existing plant symptoms. Each unique status condition is color-coded to define the required action level, and all conditions other than "satisfied" provide a transition to the appropriate FRG.

In actual application the set of generic guidelines is customized for each individual operating unit by incorporating into the step by step strategies for optimal recovery and for function restoration the subtle differences in mode of operation that derive from the specifics of installed equipment and operational philosophy that characterize each unit. The resulting documents are the sets of Emergency Response Procedures for the respective units. These "paper" procedures are translated in turn into the subroutines that make up the library of procedures utilized by the system described here in each individual application.

FIGS. 3 through 6 provide illustrations of typical displays which are generated by the system in carrying out a typical set of Emergency Response Procedures. The diplays make extensive use of color coding to enhance the operator interface. Different color are used to distinguish between parameter or component states, required actions, and high-level statements of procedure steps. Since FIGS. 3 through 6 are monochromatic as presented, the various alphanumeric portions are succeeded by one of the following symbols in parentheses which do not appear on the display but are used here to indicate the following color designations:
- (b) blue
- (g) green
- (w) white
- (y) yellow.

In addition, the boxes 61 and 71 and the dashed line 79 separating the prompts from the procedure steps are all in white.

The color coding aids the operator in understanding to which action he is responding. Thus, the user prompts are color coded to match the action required. If an action is required in the current procedure step, the prompt to complete that action is the same color (blue in the exemplary system). However, if an action is required because of a change in a continuously monitored parameter, the prompt changes color to match the color of the information in the window 65 (yellow in the example). The particular colors designated in FIGS. 3 through 6 are not critical and any desired selection of colors may be used with the correlations indicated between the prompts and the action statements.

Figure 3:
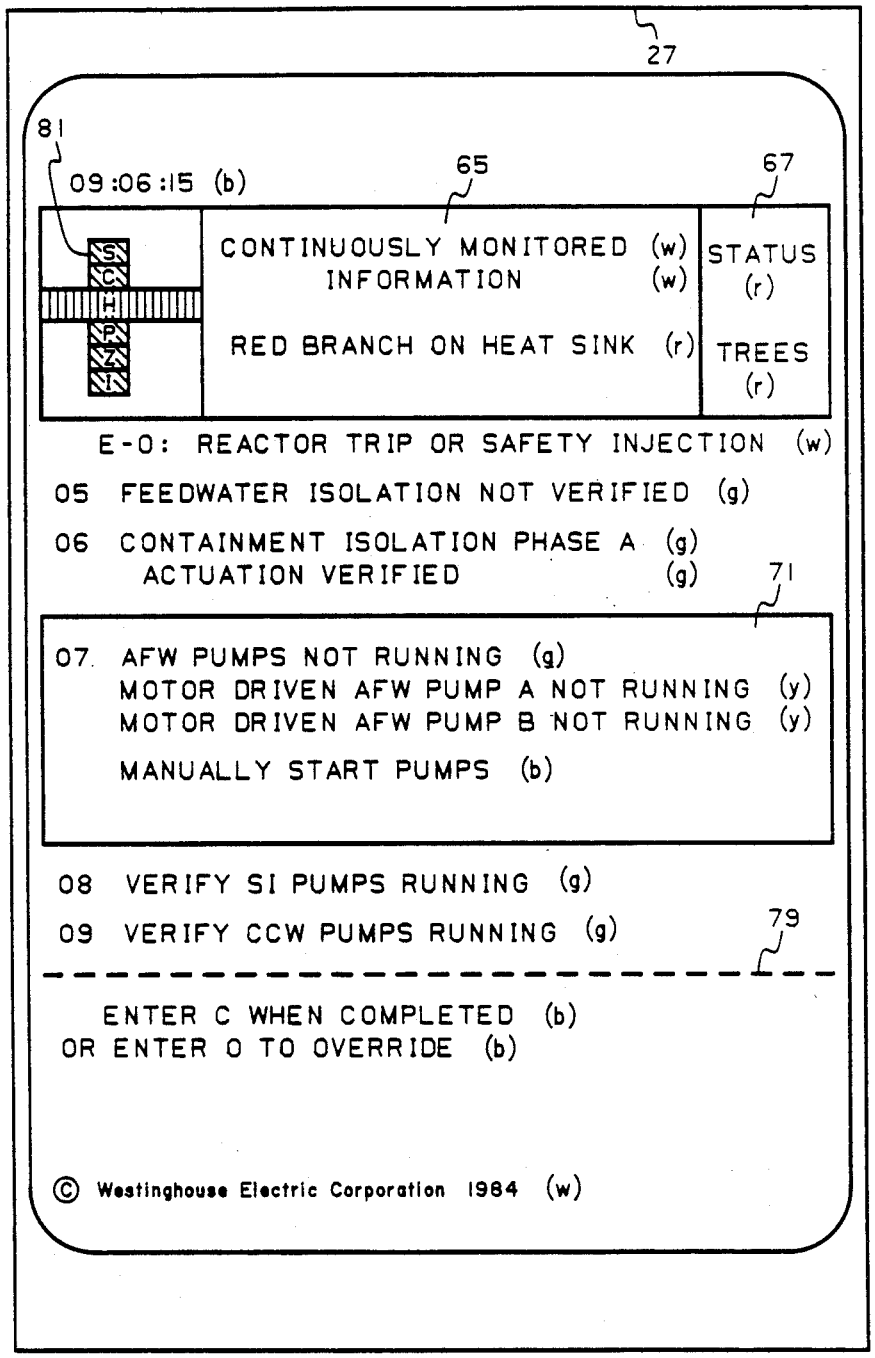

FIG. 3 indicates in the upper left corner of the display the current clock time. This figure is presented in a blue color as indicated by the symbol (b) following the time. The window 63 contains the Critical Safety Function summary display. The information for this display can be generated by the on-line monitoring system disclosed in commonly owned U.S. Pat. No. 394,078 filed on July 18, 1982. This system monitors parameters relevant to six critical safety functions and generates displays graphically illustrating the current status of each with color coding. The six critical safety functions, which are represented in window 63 by a vertical column of single letters in descending order of concern, are as follows:
- S—subcriticality
- C—core cooling
- H—heat sink
- P—reactor coolant system integrity
- Z—containment
- I—reactor coolant inventory.

The purpose of the subcriticality safety function status tree is to provide an indication of the shutdown status of the reactor. The core cooling critical safety function status tree display provides an indication of whether or not the reactor core is being adequately cooled. The heat sink critical safety function status tree display is related to the capacity of the residual heat removal system, and in the region where they are effective, the steam generators including their dump systems, to absorb the heat generated by the reactor. The reactor coolant system integrity safety function status tree determines whether the pressure in the reactor coolant system, as measured at the pressurizer, is within specified limits based upon coolant temperature and rate of change of coolant temperature. The containment critical safety function status tree provides an evaluation of the potential for a radiation leak from the containment surrounding the reactor vessel. Finally, the reactor coolant inventory status tree, by monitoring the coolant levels in the pressurizer and the reactor vessel upper head, provides information useful in determining if the quantity of water present in the primary system is satisfactory and/or if a bubble has formed in the reactor vessel head.

Each of the letters representing one of the critical safety functions is presented in black within a field 81 color coded to indicate the status of that safety function. The color coding is as follows:
- Red = existing hazardous condition
- Orange = potentially dangerous condition
- Yellow = off-normal condition
- Green = normal condition.

To further aid the operator in quickly assessing the status of each critical safety function, the width of the color coded field 81 expands in proportion to the seriousness of the abnormal condition, with the red condition completely filling the horizontal space of the window 63.

In the display of FIG. 3, all of the critical safety functions are "in the green" indicating ormal conditions, except for the Heat Sink, represented by the "H", which is "in the red" indicating that at that time this function is threatened. In the example, this red condition for the Heat Sink critical safety function is the result of a loss of all feedwater event. Activation of the "RED BRANCH ON HEAT SINK" is the "CONTINUOUSLY MONITORED INFORMATION" displayed in red in the window 65. In addition, the textual statement "STATUS TREES" is flashing in the Special Alert Indicator window 67, serving as a cue to bring the operator's attention to the fact that something is wrong with the critical safety functions.

FIG. 3 next shows in white that the active procedure is "E-O: REACTOR TRIP OR SAFETY INJECTION", which is the procedure entered upon a trip or safety injection occurrence. High level statements of steps 5 and 6 of this procedure are displayed in green immediately above the current step, which is step 7. Inside the box 71 at the center of the display is detailed information on step 7. The high-level statement in green "AFW PUMPS NOT RUNNING" indicates the overall health of the condition being examined, namely, the status of the auxiliary feedwater pumps. The detailed component data supporting the high-level statement is that neither motor driven pump A nor pump B is running. This information is displayed in yellow to distinguish it from the high level statement. The action required, "MANUALLY START PUMPS", follows in blue. High-level textual statements of the upcoming two steps, steps 8 and 9, are presented in green below the current step box 71.

Some steps of the step by step procedures involve several substeps. Step 7 of the E-O procedure illustrated in FIG. 3 is an example of such a step. The steps are divided into substeps which are presented on the display one at a time, when more than one decision is called for in a step. By dividing the step into one substep for each action recommended, there is no confusion as to the recommended action to which the operator is responding. In FIG. 3, the first substep of step 7 into the "E-O" procedure is shown. The two additional substeps of step 7 are discussed below.

Below the white dotted line 79 are the relevant user prompts. The system user requests a control board operator to start the pumps, and then enters a "C" to tell the system that the action was completed. If the system user chooses to override the required action for any reason, he can enter an "O" to override the action and continue to the next step. The prompts in this instance are blue, the same color as the recommended action.

FIG. 4 represents some later time in the sequence when step 16 of the Reactor Trip or Safety Function procedure is the current step. The high-level statement of this step indicates that the auxiliary feedwater flow is less than a preselected value. The recommended action states that a transition to FR-H.1 should be made if an auxiliary feedwater flow above the selected value cannot be established. The prompts permit the user to authorize the transition by entering "T" or to override the recommended action and remain in the E-O procedure by entering "O". This transition to the Response to Loss of Secondary Heat Sink procedure is brought on by the red condition of the heat sink critical safety function.

FIG. 5 illustrates the display presented after the transition has been made to the "FR-H.1: RESPONSE TO LOSS OF HEAT SINK" procedure and step 5 of this new procedure has been reached. As noted in this display, the CONTINUOUSLY MONITORED INFORMATION is a caution note which is to be considered in parallel with the current procedure.

In the situation presented by the display of FIG. 6, the Safety/System Status window indicates that the heat sink control safety function is still in the red, and that now the core cooling safety function is yellow indicating an off-normal condition. The parallel condition processor, which continuously monitors the status of the critical safety functions, has determined at this point that action is called for in response to these conditions and the priority evaluator has established that this action should take precedence. The action recommended is manual reinitiation of safety injection. The operator is made aware that the prompts are associated with the action recommended by the continuously monitored condition by coding the prompts the same color as the action recommended textual statement in the continuously monitored information window, yellow in this instance. The Special Alert Indicator window 67 displays a flashing "CAUTON" indication to draw the user's attention to this situation.

As can be appreciated, a major advantage of the display generated in accordance with the invention is that all of the information is brought to one place for use by the operator. Critical Safety Function status, current procedure step status, actions recommended, and user prompts are all available for viewing at the same time. In addition, if any Notes or Cautions become active, this information is also displayed to the user. The user is not burdened with remembering whether a parameter or component should be checked; the system does it for him. As a result, the user is able to concentrate on transient recovery, while the system serves as his memory.

Another significant contribution of the invention is the generation by the logger of a chronological record of the procedures performed and the associated conditions, for later review and analysis. As previously mentioned, a permanent copy of the record can be generated by a printer or a tape unit connected to the computer. Tables I through III which follow illustrate the types of information that can be generated. Table I identifies each procedure that was implemented, the time it was initiated and the number of the last step completed.

TABLE I

| Entry Time | Procedure | Last Step Completed |
|---|---|---|
| 09:10:50 | E-O | 16 |
| 09:13:40 | FR-H.1 | 10 |

In this example, it is evident that the "Reactor Trip or Safety Injection" procedure, "E-O", was entered at 09:10:50 and that 16 steps of this procedure were completed before a transition was made at 09:13:40 to the 20 "Response to Loss of Heat Sink" procedure, FR-H.1.

The logger also provides a record of the time that each individual step or substep in a procedure was executed by the operator and the status at the conclusion of the step or substep of the condition considered. An example of this record for the "Reactor Trip or Safety Injection" procedure E-O, is shown in Table II.

TABLE II

| Procedure | Step | Finish Time | Step/Sub-step Status At Finish | | | |
|---|---|---|---|---|---|---|
| E-O | 1 | 09:05:30 | 2 | 2 | 2 | 2 |
| E-O | 2 | 09:05:35 | 2 | | | |
| E-O | 3 | 09:05:40 | 2 | 2 | | |
| E-O | 4 | 09:05:50 | 2 | | | |
| E-O | 5 | 09:06:05 | 2 | 2 | 2 | 2 |
| E-O | 6 | 09:06:15 | 2 | 2 | | |
| E-O | 7 | 09:06:25 | 1 | −2 | 2 | |
| E-O | 8 | 09:06:50 | 2 | 2 | 2 | |
| E-O | 9 | 09:07:00 | 2 | | | |
| E-O | 10 | 09:07:25 | 2 | | | |
| E-O | 11 | 09:07:50 | 2 | | | |
| E-O | 12 | 09:08:20 | 2 | | | |
| E-O | 13 | 09:09:05 | 2 | | | |
| E-O | 14 | 09:09:30 | 2 | | | |
| E-O | 15 | 09:09:55 | 2 | 2 | | |
| E-O | 16 | 09:10:45 | 1 | | | |
| FR-H.1 | 10 | 09:13:40 | 1 | | | |

The numerical symbols in the "Step/Sub-step Status At Finish" column represent the status of the condition for each step or substep with a "2" indicaitng that the condition is verified by the sensors. The numeral "1" indicates that the condition was not verified by the sensors, but that the operator indicated that the recommended manual action had been completed. An "O" indicates that the required action was overridden. Some substeps do not require operator action but indicate whether a particular condition exists or not. An example of this occurs in Step 7. The first substep checks the motor driven auxiliary feedwater pumps as was illustrated by the display of FIG. 3. The "1" indicates that the sensors detected that the pumps were not on, but that the operator indicated that he activated the switches to start them. The second substep of Step 7 determines whether it is necessary to have the turbine driven pump on. The "−2" indicates that it is not necessary. A "−1" would have indicated that it was necessary. The third substep then checks if the turbine driven pump is on. The "2" indicates that the sensors detect that it is on in the situation depicted by the example.

The logger also generates a chronological record of the condition of the status trees as shown here in Table III:

TABLE III

| Survey Time | Active Branches | | | | | | Branch Colors | | | | | |
| --- | --- | --- | --- | --- | --- | --- | --- | --- | --- | --- | --- | --- |
| | S | C | H | P | Z | I | S | C | H | P | Z | I |
| 09:05:40 | 4 | 8 | 1 | 8 | 5 | 5 | G | G | R | G | G | G |
| 09:05:45 | 4 | 8 | 1 | 8 | 5 | 5 | G | G | R | G | G | G |
| . | . | | | | | | | | | | | |
| 09:12:05 | 4 | 5 | 1 | 8 | 5 | 5 | G | Y | R | G | G | G |
| 09:12:10 | 4 | 5 | 1 | 8 | 5 | 5 | G | Y | R | G | G | G |
| . | . | | | | | | | | | | | |
| 09:17:10 | 4 | 5 | 5 | 8 | 5 | 5 | G | Y | Y | G | G | G |

In this example, the status tree condition is recorded continually at 5 second intervals. The letters "S" through "I" in the titles represent the six critical safety functions identified previously. The letters G, Y, O and R listed under each safety function in the "Branch Color" columns represent the green, yellow, orange and red colors presented on the CRT to indicate the relative seriousness of the threat to the respective safety functions. The numerals shown below the symbols for each of the critical safety functions identify the branch of the respective tree which is active and therefore generated the branch color signal. Generally, the branches are arranged so that the lower the number the higher the threat. Since the various status trees have different numbers of branches, similarly numbered branches in different trees may have different colors; although in all the status trees the first branch indicates one of the most serious threats to that safety function.

MULTIPLE STATIONS AND MULTIPLE PROCEDURES

In large complex facilities such as electrical generating units or chemical production plants, the situation frequently arises in carrying out normal maintenance or operational procedures that the operations to be carried out require close coordination among personnel at various mutually remote work stations in the facility. Plant or major system startup is an example of such operations. Under these circumstances, it is normal practice to have the coordinating and sequencing of the necessary actions done by an individual in the facility's central control room. respective work stations are usually carried out by telephone or with the facility's public address system and tend to be relatively sparse. Workers at work locations other than the one directly involved at any given time in the operations usually have little knowledge of how the process is proceeding until the current stage is completed and the completion is reported to the central control room and from there to the next work station involved. The net results are a relatively high inefficiency in execution of the procedure, with only one work station at a time active, and a distinct danger of equipment damage or bodily harm to the workers as a result of incomplete or erroneous communications.

The present invention allows all involved stations to monitor the step by step progress of the operations at hand. This results in greater efficiency in operation since steps previously performed sequentially due to communications constraints can in many cases be done concurrently because each worker knows the status of activities at other work stations. It also results in reduced likelihood of error and harm to equipment and personnel. Depending on the particular application and need the terminals could be either passive, simply displaying information generated by the host computer, or active, transmitting local operator input to the host computer as well as displaying computer output to the operator.

Incorporation of a simple "acknowledge" feature in active terminals allows the logging in a permanent record that all stations involved in executing a multi-station procedure were aware that the workers at a given station were beginning to execute a particularly sensitive or important step in the procedure.

In another application, the execution of several nominally unrelated procedures can be individually but concurrently monitored by a version of the automated procedures package. In this embodiment the parallel process monitoring feature of the respective procedures is used to detect potentially undesirable or unacceptable conflicts between actions carried out by personnel in accordance with one procedure and those carried out either by the same persons or by other personnel following a second procedure. For example, a maintenance procedure may call for the isolation of a particular system while an operational procedure being carried out in another part of the facility requires the availability of that system. Since multiple automated procedures packages share a common data base, removal of the postulated system from service in response to the first procedure immediately results in a parallel condition processor response in the second procedure implementation and hence alerts the workers to the impending conflict before damage is sustained.

Figure 7:
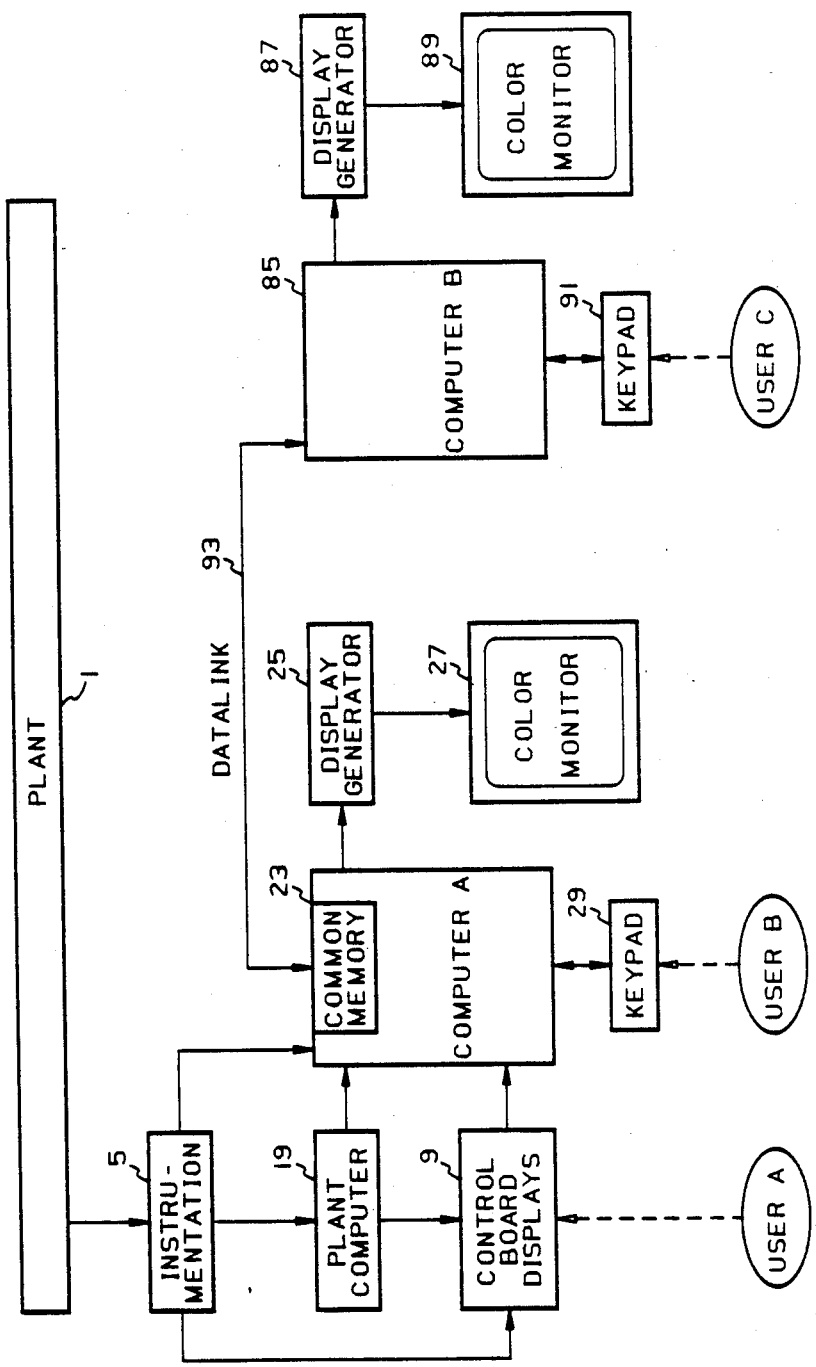
FIG. 7 is a schematic diagram of a modification of the system of FIG. 1 for multiterminal monitoring of a single procedure or for the execution of more than one procedure at a time.

FIG. 7 illustrates a system wherein two users, B and C, execute procedure steps at two separate locations in the plant, which may be side by side or remotely spaced from one another. The left side of FIG. 7 is identical to FIG. 1 in that a computer 23 monitors data from the plant instrumentation 5, plant computer 19 and control board displays 9, and generates sequential procedure step information and parallel monitored conditions which are transmitted to a display generator 25 for presentation on the color monitor 27. The user B communicates his execution of the current step, or his instructions to override the step or transfer to another procedure, through the keypad 29. As noted earlier, the system, through its continuous monitoring and update features, can also recognize that recommended actions have been performed and adjust the displayed prompts to allow the user to pass directly to the next step. A second computer 85 generates signals for a second display generator 87 which in turn generates the displays for a second color monitor 89 for a user C who communicates with the system through another keypad 91. The user C and this additional equipment may be located anywhere in the plant. A datalink 93 connects the computer 85 with the computer 23.

For the situation where the system is only to be used for multiple users to execute a single procedure from different locations in the plant, the computer 85 need only provide an interface between the display generator 87 and keypad 89 and the computer 23, and in fact these components could be incorporated into a so-called "smart terminal." Where the system is to be used to perform two procedures simultaneously, the tasks required to monitor the execution of the second procedure can be carried out in the computer 85 which shares a common memory 95 with the computer 23. This common memory is a portion of the plant data processor 41 resident in computer 23 which generates the logic signals from the plant sensor signals received from this instrumentation 5 and the calculated parameter received from the plant computer 19. Alternatively, where the computer 23 has sufficient capability, the tasks required for the second procedure can be carried out by the computer 23 in which case, the computer 85 again need only provide the interface for the second terminal.

Figure 8:
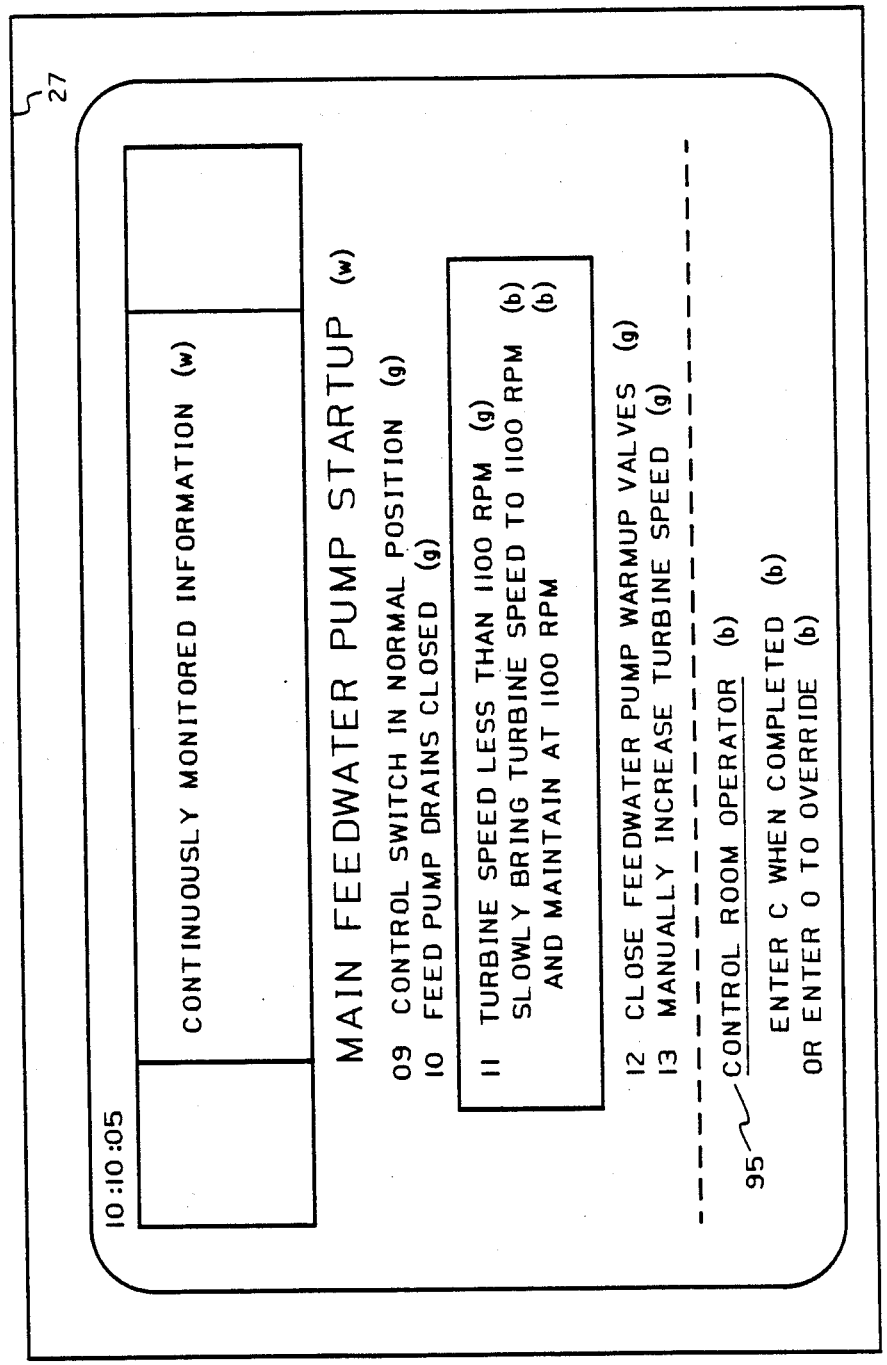
FIGS. 8 and 9 illustrate typical displays for two separate terminals generated by the system of FIG. 7 for interactive monitoring of a procedure carried out by users at two different locations.
Figure 9:
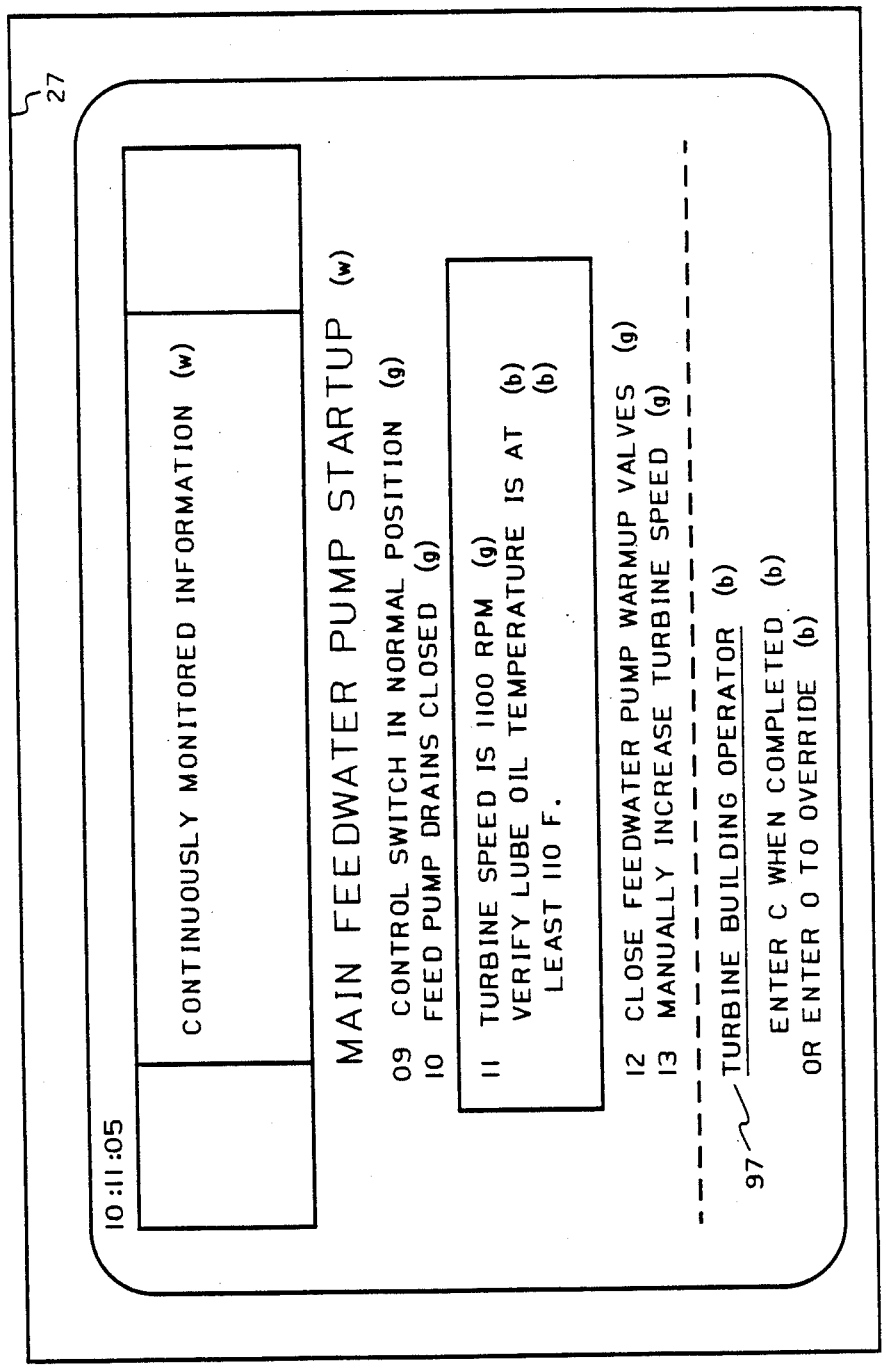

FIGS. 8 and 9 illustrate the execution of a single procedure by multiple users utilizing the embodiment of the system illustrated in FIG. 7. In the example, the plant personnel are following the "Main Feedwater Pump Startup" procedure. Actions are required in both the control room and the turbine building. The figures illustrate what the display screens might look like at two sequential times.

At time 10:10:05, the crew is on Step 11 as shown in FIG. 8. The action required is of the control room operator, and this is noted clearly on the screen by the notation 95 in the prompts section. The control room operator enters a "C" or an "O," as appropriate.

At time 10:11:15 as shown in FIG. 9, the crew is still on Step 11, but the action is now required of the turbine building operator, and this is also clearly noted in the prompts section of the display at 97. The turbine building operator enters a "C" or an "O," as appropriate.

The above scenario illustrates how this embodiment of the invention facilitates multi-station procedure following, by specifically directing the responsible user to complete an action.

Figure 10:
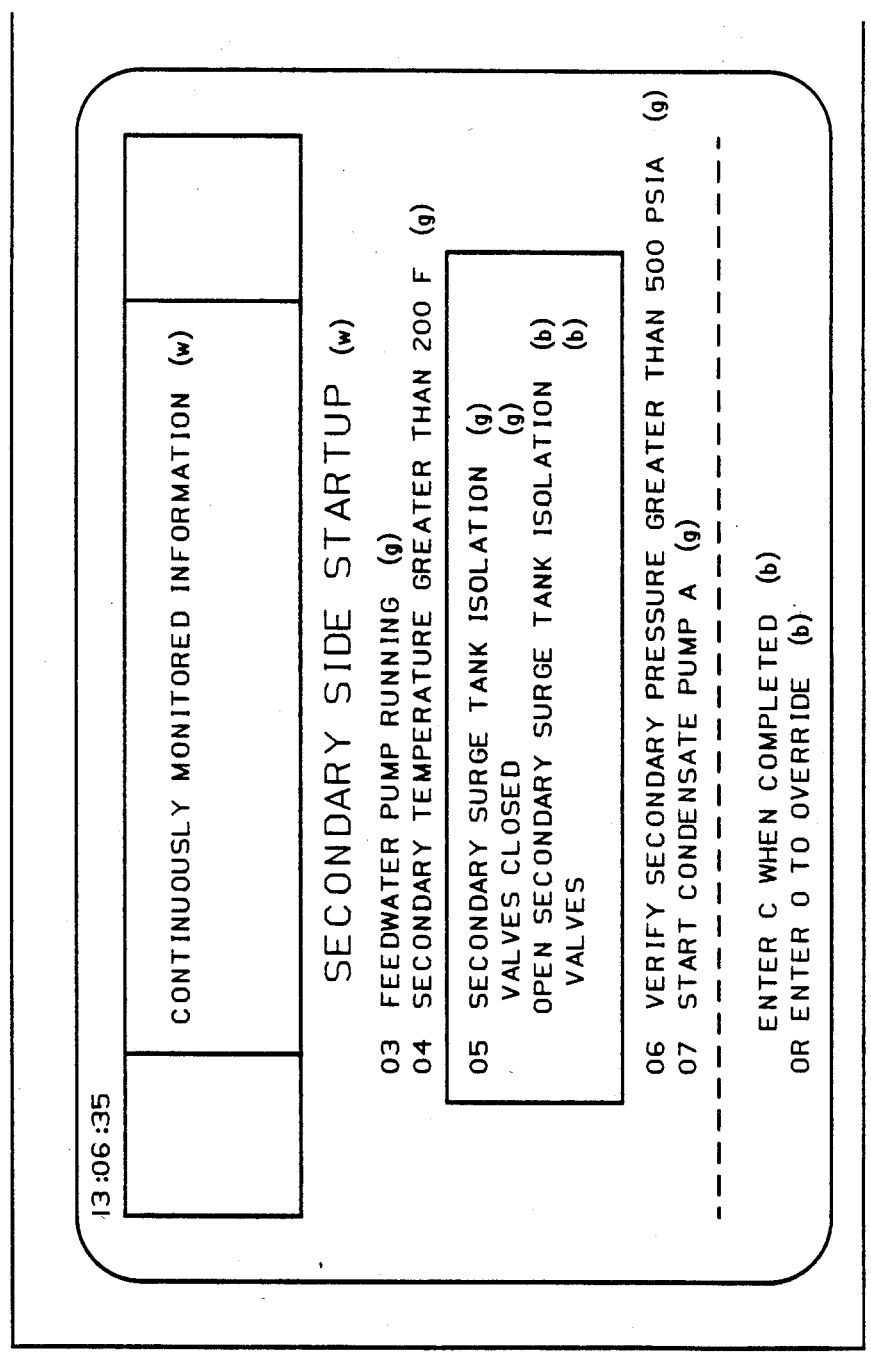
FIGS. 10 and 11 illustrate typical displays for two separate terminals generated by the system of FIG. 7 for interactive monitoring of the simultaneous execution of two different procedures.
Figure 11:
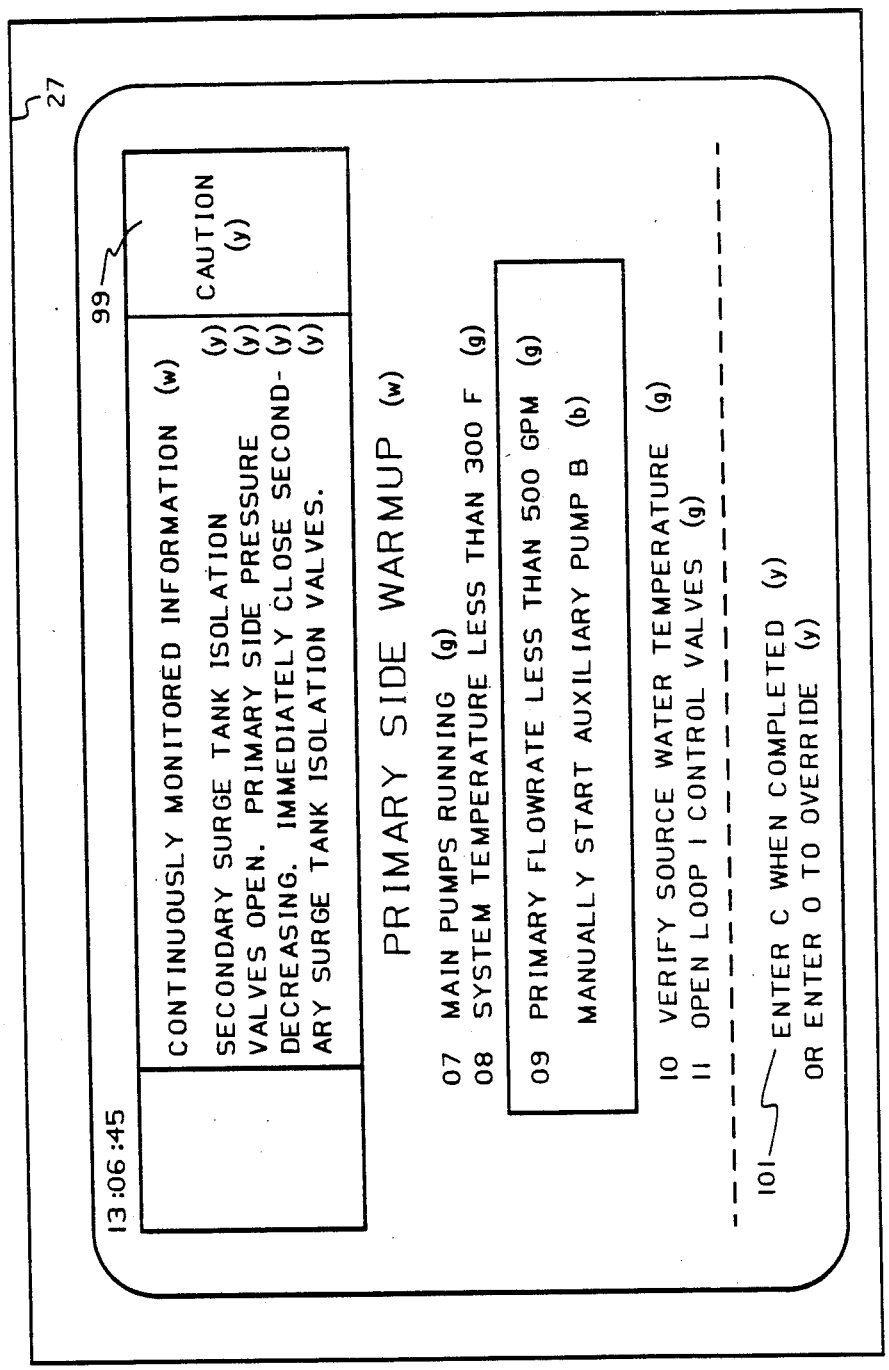

FIGS. 10 and 11 illustrate another application of the embodiment shown in FIG. 7. In the example, the plant personnel are following two distinct procedures, "Secondary Side Startup" in FIG. 10 and "Primary Side Warmup" in FIG. 11. The intent of this description is to indicate how the system appears to the two people who are following the procedures. Further, the scenario illustrates how an action required by the "Secondary Side Startup" procedure influences the "Primary Side Warmup" procedure.

At time 13:06:35, an operator is following the "Secondary Side Startup" procedure. He is on Step 5, and he is instructed to open the secondary surge tank isolation valves. His color monitor presents the display shown in FIG. 10.

At time 13:06:45, a different operator is following the "Primary Side Warmup" procedure and the display presented to him is shown in FIG. 11. He is on Step 9. Note, however, that a caution 99 has appeared in the upper part of the CRT screen. The caution draws attention to the Continuously Monitored Information which indicates that the secondary surge tank isolation valves are open, and that primary side pressure is decreasing. The action recommended is to immediately close the secondary surge tank isolation valves. The operator is prompted to do this via the prompts 101 on the bottom of the screen color coded to the Continuously Monitored Information.

This scenario shows how an action required by one procedure can propagate to a different procedure. Ordinarily, conflicts are avoided by control room coordination of multiple procedure execution. However, there is still the potential risk of a mistake, and at best, time may be lost in coordinating activities around the plant. In this case, the isolation valves should not have been opened. However, the valves were opened, but the Parallel Condition Processor associated with the Primary Side Warmup procedure monitored the opening and generated the cautionary message appearing on the second CRT screen to alert the second operator.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of on-line monitoring of the execution by a human operator of procedures for a complex process facility comprising the steps of:

storing electric signals representative of step by step procedures for the complex process facility, at least some steps of which require verification of a selected process condition;

generating parameter signals representaitve of the real time value of predetermined process parameters;

sequentially electrically selecting a step of one of said stored step by step procedures as a current step;

electrically processing selected parameter signals to determine the state of the process condition to be varied by a current step which requires verification;

generating a visual representation of said current step including a visible textual statemenet of the condition to be verified, a visual indication of the state of the selected process condition to be verified by the current step, and, where the state of the selected condition indicates that it is not verified, a visible textual statement of recommended operator action;

providing means for the operator to electrically generate an operator response signal in response to a textural statement of recommended operator action by said visal display of said current step, including providing means for the operator to select between electrically generating an action complete response signal and an override response signal, and electrically sequentially selecting the next step in said stored procedure as the current step in response to said operator response siganl.

2. The method of claim 1 including the step of updating the visual indication of the state of the selected process condition to be verified by the current step and the visible statement of recommended operator action in response to changes in the selected process condition as a result of operator response to the recommended action.

3. The method of claim 1 wherein said step of generating said visual representations includes generating the same at two separate locations and wherein the step of providing means for the operator to electrically generate an operator response signal includes providing such means at said two separate locations.

4. The method of claim 3 wherein said step of generating a visible textual statement of recommended operator action includes generating a visual indication of which of said two locations at which the action is required.

5. The method of claim 1 including the steps of electrically monitoring, while successive current steps of said stored step by step procedures are being executed, certain parameter signals representative of another process condition not being addressed by said current steps and simultaneously, with the generation of the visual display of said current step, generating a visual indication of said another process condition when the monitoring step generates an indication that said another process condition is in a specified state which warrants attention.

6. The method of claim 5 wherein said step of generating a visual indication of said another process condition includes generating a visible textual statement of action recommended in response to said another process condition when the moitoring step generates an indication that the state of the another process condition requires immediate attention and providing a visual indication that said statement of action recommended in response to said another process condition has priority over the action recommended in response to the current step.

7. The method of claim 1 including electrically logging the response signals generated by the operator.

8. The method of claim 6 including electrically removing the visible textual statement of the action recommended in response to the another process condition upon generation by the operator of either a complete or override signal.

9. The method of claim 8 wherein the steps of generating the visual representation of said current step and of generating a visual indication of said another process condition include generating said representation and indication at two spaced apart locations and wherein the step of providing means for the operator to select between electrically generating a complete signal and an override signal includes providing such means at both of said spaced apart locations.

10. The method of claim 6 including generating a prominent visual indication when the values of said specified parameters indicate that the overall status of the process facility is in a state requiring immediate operator action and a visible textual statement of a specified step by step procedure which should be implemented in response thereto, providing means by which the operator can selectively generate a transfer signal in response to the prominent visual indication, and electrically selecting a step of said specified step by step procedure in response to a transfer signal in place of the step which is the current step at the time of the generation of said prominent visual indication.

11. The method of claim 10 including in response to an override signal generated by the operator, maintaining as the current step, the step which was current at the time that the prominent visual indication was generated.

12. The method of claim 1 including the steps of continuously electrically monitoring the overall status of the process facility as represented by the values of specified parameters and generating simultaneously with the display of said current step a visual display of said overall status of the process facility.

13. A method of on-line monitoring of the execution by a human operator of procedures for a complex process facility comprising the steps of:
storing electrical signals representative of step by step procedures for the complex process facility;
generating sequentially from said stored electrical signals a visual representation of the current step to be executed of said step by step procedures, in the form of a textual statement of the current step and a textual statement of operator action recommended in response to said current step;
generating visual prompts informing the operator of how to generate an input signal in response to the visible textual statement of recommended action;
providing means for the operator to electrically generate such an input signal;
indexing the current step to the next step in the stored step by step procedures in response to an input signal generated by the operator;
measuring selected process parameters and generating parameter signals representative of the measured values of said selected parameters; and
simultaneously with said visual representation of the current procedure step, and in response to predetermined values of said parameter signals indicative of an abnormal process condition, generating a visual indication of the existence of the abnormal condition.

14. The method of claim 13 wherein the step of generating a visual indication of the abnormal condition includes generating a visible textual statement of the abnormal condition, generating a visible textual statement of operator action recommended in response to the abnormal condition, and selectively generating visual prompts for the operator to indicate a response thereto, and said method including the step of electrically assigning priorities to the action required by said current step and the recommended action in response to the abnormal condition, and wherein said step of generating the visual prompts includes only generating a display of the prompts associated with the visible textual statement of recommended action for the action having the higher priority.

15. The method of claim 14 including generating indicia to visually indicate the association of the prompts displayed with the appropriate one of the recommended action in response to the current step and the recommended action in response to the abnormal condition.

16. The method of claim 15 wherein the visible textual statement of recommended action in response to the current step is presented in one color, the visible textual statement of recommended action in response to the abnormal condition is presented in a second color, and the prompts are generated in the same color as the visible textual statement of recommended action which is in priority.

17. The method of claim 15 including automatically electrically logging the occurrence of each current step, abnormal condition and input signal generated by the operator.

18. The method of claim 17 including providing means by which an operator can generate an override signal in response to the generation of prompts associated with a priority visible textual statement of recommended action for an abnormal condition, and regenerating the prompts associated with the visible textual statement of recommended action by the current step in response to said override signal.

19. The method of claim 13 including the step of generating simultaneously with the visual representation of the current step, a visible representation of the textual statements of a selected number of most recent current steps.

20. The method of claim 13 including the step of generating simultaneously with the visual representation of the current step a visible representation of the textual statements of a selected number of subsequent steps in the step by step procedures.

21. The method of claim 20 including the step of generating also a visual representation of the textual statement of a selected number of the most recent current steps.

22. A method of on-line monitoring of the execution of procedures for a complex process facility comprising the steps of:
storong sets of electrical signals representative of a plurality of step-by-step procedures for the complex process facility;
generating on an on-line basis, parameter signals representative of the current values of selected process parameters;
selecting the set of electrical signals representative of one of said step-by-step procedures based upon the values of said parameters signals;
generating sequentially from said selected electrical signals a visual representation of each step of the selected procedure, one step at a time, at least some of said steps including generating a visual recommendation to the operator that a transfer be made to another set of stored electrical signals representative of another one of said step-by-step procedures based upon the current values of certain of said process parameters selected by the visually presented step;
providing means for an operator to generate an electrical response signal to each visually presented step;
indexing said visual display to the next step in the selected procedures in response to each response signal; and
providing mens for the operator to select between generating an electrical transfer signal and an electrical override signal in response to said visual recommendation, selecting in response to a transfer signal said another set of stored electrical signals representative of another one of said procedures for sequential generation of a visual representation of each step, and continuing in response to an override signal to generate a visual respresentation of each step in the first selected procedure.

23. The method of claim 22 including the steps of electrically monitoring the current values of designated ones of said parameter signals in parallel with the sequential generation of a visual representation of each step of the selected procedure, generating a visual representation of a recommendation to transfer to a designated set of stored electrical signals representative of a different procedure than the selected procedure in response to selected values of said designated parameters, selecting said different set of stored signals for generating sequentially visual representation of each step of said different procedure in response to the generation of a transfer signal by the operator, and continuing to generate a visual representation of each step of the first selected procedure in response to an override signal.

24. The method of claim 22 wherein said step of generating a visual representation of each step of the selected procedure includes generating such visual representations at two separate locations, and wherein said step of providing means for an operator to generate an electrical response signal to each visually presented step includes providing such means at said two separate locations.

25. A method of on-line monitoring of the execution of procedures for a nuclear power plant comprising the steps of:
storing sets of electrical signals representative of a plurality of step-by-step plant procedures;
generating on an on-line basis, parameter signals representative of the current values of selected plant parameters;
selecting a set of electrical signals representative of one of said step-by-step procedures;
generating sequentially from said selected electrical signals a visual representation of each step of the selected procedure;
electrically monitoring the current values of designated ones of said parameter signals in parallel with the sequential generation of a visual representation of each step of the selected procedure;
generating a visual representation of a recommendation to transfer to a designated set of stored electrical signals representative of a different procedure than the selected procedure in response to selected values of said designated parameters;
providing means for an operator to select between generating an electric transfer signal and an electric override signal; and
electrically selecting said different set of stored signals for generating sequentially the visual representation of each step of said different procedures in response to the generation of a transfer signal by the operator, and continuing to generate a visual representation of each step of the first selected procedure in response to an override signal.

26. The method of claim 25 wherein the selected parameters include parameters indicative of a reactor trip and wherein said step of selecting a set of electrical signals representative of one of said step-by-step procedures is performed electrically in response to an indication of a reactor trip.

27. The method of claim 26 wherein at least some of said steps of the selected procedure electrically monitor certain plant parameters to verify the status of certain plant conditions and to generate a visual representation of a textual statement of recommended action selected from a library of textual statements when said certain condition is not verified.

28. The method of claim 27 wherein the step of electrically monitoring the current values of designated ones of said parameter signals in parallel with the sequential generation of a visual representation of each step of the selected procedure includes, monitoring parameters representative of plant critical safety functions and generating a visual display representative of said status of each of the critical safety functions.

29. Apparatus for on-line interactive monitoring of the execution of procedures in a complex process plant comprising:
a plurality of sensors for generating sensor signals representative of the current values of a plurality of plant parameters;
a storage medium for storing electrical signals representative of the steps of a plurality of step-by-step procedures as a current step, to process selected
a digital computer programmed to sequentially select stored signals representative of a selected one of the steps of one of said plurality of step-by-step procedures as a current step, to process selected sensor signals to determine the status of a process condition selected by the current step and recommended action as a result thereof, and to select from said library textual statement signals representative of the current step, the status of the designated process condition and the recommended action;

a display device for generating a visible display of said textual statements; and an input device including means by which an operator generates a response signal to the visible display, said digital computer being further programmed to generate in the display device selected prompts including a completion prompt to indicate completion of the action recommended by the current step and an override prompt to indicate an override of the recommended action, said input device including means for the operator to generate completion and override response signals responsive to the respective prompts.

30. The apparatus of claim 29 wherein said digital computer is further programmed to continuously monitor certain of the sensor signals to generate additional status signals representative of the current status of designated process conditions other than the conditions selected by the current steps, and to select from said library additional textual statements in response to the additional status signals, and wherein said display device includes means to generate a visible display of said additional textual statements simultaneously with the display of the textual statements associated with the current step.

31. The apparatus of claim 30 wherein said digital computer is further programmed to indicate action recommended in response to a specified status of said designated other process conditions, to determine priority between the action recommended in response to the current step and the other process conditions, to select textual statements of action recommended, and to generate prompts associated with the priority action, and wherein said display device includes means to generate a visible display of the priority action textual statement and prompts, and to visually associate the prompts with the priority action recommended.

32. The apparatus of claim 31 wherein said means for visually associating the prompts with the textual statements of priority action recommended include means for generating different portions of the display in different colors and for generating the textual statement of the priority action recommended and the prompts in the same color.

33. The apparatus of claim 32 wherein the priority action recommended is to transfer to another of said plurality of step-by-step procedures, wherein said prompts include a prompt for implementing such transfer, wherein said input device includes means to generate a transfer signal in addition to said complete and override signals and wherein said digital computer is programmed in response to said transfer signal to select said another step-by-step procedure and sequentially select the steps thereof as the current step.

34. The apparatus of claim 33 including means for generating a chronological log of the current steps, the status conditions and the operator generated response signals.

35. The apparatus of claim 34 wherein said digital computer is further programmed to continuously monitor previously determined sensor signals and to generate therefrom safety status signals representative of overall plant safety conditions, and wherein said display device includes means to generate a visible indication of overall plant safety status in response to the safety status signals simultaneously with the display of said textual statements and additional textual statements.

36. A method of on line monitoring of the simultaneous execution of two different procedures for a complex process facility comprising the steps of:

storing electrical signals representative of at least two, step-by-step procedures for the complex process facility;

generating parameter status signals representative of the real-time status of predetermined process parameters and storing said parameter status signals in a common memory;

electrically selecting electrical signals representative of one of said procedures as a first active procedure, presenting sequentially on a first display a visual textual statement of action recommended by each step of said first active procedure to be executed, said actions affecting the status of some of said stored parameter status signals, and simultaneously electrically monitoring selected parameter status signals stored in the common memory and generating a visual indication on said first display of any conditions represented by the real-time status of said selected parameter status signals which conflict with the first active procedure; and simultaneously electrically selecting electrical signals representative of another one of said procedures as a second active procedure, presenting sequentially on a second display a visual textual statement of action recommended by each step of said second active procedure to be executed, said actions affecting the status of certain of said stored parameter status signals, and simultaneously electrically monitoring predetermined ones of said parameter status signals stored in the common memory and generating a visual indication on said second display of any conditions represented by the real-time status of said predetermined ones of said parameter status signals which conflict with the second active procedure.

37. The method of claim 36 wherein the steps of sequentially presenting a visible textual statement of action recommended by each step of said first and second active procedures each include electrically determining the status of designated ones of the parameter status signals stored in said common memory and selecting from a library of textual statements a statement for visual presentation dependent upon the status of said designated parameter status signals, generating on the respective displays visual prompts indicating steps to take to generate an input signal in response to the selected textual statement, and presenting the next step in the procedure in response to said input signal.

38. The method of claim 37 wherein said steps of generating a visual indication of conditions which create a conflict include choosing from said library a textual statement of action recommended by the respective operator in response to the conflict condition and generating prompts indicating to the respective operator steps to take to generate an input signal in response to the chosen statement in place of the prompts generated for the action recommended by the visibly presented step of the appropriate one of the first and second procedures.

39. Apparatus for on-line monitoring of the simultaneous execution of two different procedures for a complex process facility comprising:

a plurality of sensors for generating parameter signals representative of the current values of a plurality of facility parameters;

digital processing means having memory in which at least two, step-by-step procedures and libraries of textual statements are stored and including common memory, said digital processing means being programmed, to process said parameter signals to generate parameter status signals representative of the real-time conditions in the facility, to store said parameter status signals in said common memory, to independently sequentially select a step from two different step-by-step procedures stored in memory as the current step of a first and second active procedure respectively, to independently determine as to the current step of each active procedure the condition of associated stored parameter status signals and action recommended as a result hereof, to independently select from said library, textual statements for the current step and the actions recommended thereby for each active procedure, to independently as to each active procedure simultaneously monitor certain parameter status signals stored in said common memory and when the values thereof indicate a conflict with the associated active procedure, to select a textual statement from the library indicative of the same; and display means for generating for each active procedure a visible display of the textual statement of the current step and the action recommended thereby, and when conditions so indicate, the textual statement of a conflict between the monitored parameter status signals and that active procedure.

40. The apparatus of claim 39 wherein said display means comprises a first display device upon which the visible display for the first active procedure is generated and a second display device upon which the visible display for the second active procedure is generated.

41. The apparatus of claim 39 wherein said digital processing means is further programmed to generate prompts to indicate steps to be taken in response to a visual statement of action recommended by the first and second procedures, and wherein said first and second display devices generate visual displays of the prompts associated with the first and second active procedures respectively, said apparatus also including first input signal generating means by which an operator generates first electrical input signals to the digital processing means as indicated by the prompts displayed by the first display device, and second input signal generating means by which an operator generates second electrical input signals to the digital processing means as indicated by the prompts displayed by the second display device, said digital processing means being programmed to select the next step as the current step in the first active procedure in response to said first input signal and to select the next step as the current step in the second active procedure in response to said second input signal.

42. The apparatus of claim 41 wherein said digital processing means comprises:

first digital computing means having said common memory and programmed to generate said parameter status signals and store them in said common memory, and to perform all the program functions associated with the first active procedure;

second digital computing means programmed to perform all of the program functions associated with the second active procedure; and data link means connecting the second digital computing means with the common memory in the first digital computing means, said first display device and first input signal generating means being connected to the first digital computing means and the second display device and second input signal generating means being connected to the second digital computing means.

43. A method of on-line monitoring of the simultaneous execution of two different procedures for a nuclear power plant comprising the steps of:

storing electrical signals representative of at least two, step-by-step procedures for the plant;

generating parameter status signals representantive of the real-time status of predetermined process parameters and storing said parameter status signals in a common memory;

electronically selecting electrical signals representative of one of said procedures as a first active procedure, electrically determining for each step of said first active procedure the status of designated ones of the parameter status signals stored in said common memory, presenting sequentially on a first display a visual textual statement of action recommended by each step of said first active procedure to be executed based upon the status of said designated parameter status signals, said actions affecting the status of some of said stored parameter status signals, and simultaneously electrically monitoring selected parameter status signals stored in the common memory and generating a visual indication on said first display of any conditions represented by the real-time status of said selected parameter status signals which conflict with the first active procedure; and simultaneously electrically selecting electrical signals representative of another one of said procedures as a second active procedure, electrically determining for each step of said second active procedure the status of designated ones of the parameter status signals stored in said common memory, presenting sequentially on a second display a visual textual statement of action recommended by each step of said second active procedure to be executed based upon the status of said designated parameter status signals, said actions affecting the status of certain of said stored parameter status signals, and simultaneously electrically monitoring predetermined ones of said parameter status signals stored in the common memory and generating a visual indication on said second display of any conditions represented by the real-time status of said predetermined ones of said parameter status signals which conflict with the second active procedure.

* * * * *